United States Patent
Waghmare et al.

(10) Patent No.: US 11,814,100 B2
(45) Date of Patent: Nov. 14, 2023

(54) VEHICLE CRADLE ASSEMBLY WITH IMPACT DETACHMENT SCRIPT

(71) Applicants: Sunil Waghmare, Rochester Hills, MI (US); Abhijeet Thorat, Troy, MI (US); Homyoung Kim, South Lyon, MI (US)

(72) Inventors: Sunil Waghmare, Rochester Hills, MI (US); Abhijeet Thorat, Troy, MI (US); Homyoung Kim, South Lyon, MI (US)

(73) Assignee: FCA US LLC, Auburn Hills, MI (US)

( * ) Notice: Subject to any disclaimer, the term of this patent is extended or adjusted under 35 U.S.C. 154(b) by 226 days.

(21) Appl. No.: 17/348,837

(22) Filed: Jun. 16, 2021

(65) Prior Publication Data
US 2022/0402550 A1 Dec. 22, 2022

(51) Int. Cl.
*B62D 21/11* (2006.01)
*B62D 21/15* (2006.01)
*B62D 27/06* (2006.01)

(52) U.S. Cl.
CPC ............ *B62D 21/11* (2013.01); *B62D 21/155* (2013.01); *B62D 27/06* (2013.01)

(58) Field of Classification Search
CPC ....... B62D 21/11; B62D 21/155; B62D 27/06
USPC .................................................. 296/187.09
See application file for complete search history.

(56) References Cited

U.S. PATENT DOCUMENTS

| | | | |
|---|---|---|---|
| 6,120,059 A * | 9/2000 | Beckman | B62D 21/11 296/205 |
| 8,807,597 B2 | 8/2014 | Akaki et al. | |
| 8,870,224 B2 * | 10/2014 | Dandekar | B62D 21/11 280/784 |
| 9,016,768 B2 * | 4/2015 | Makino | B62D 25/082 296/187.1 |
| 10,086,875 B2 | 10/2018 | Nishikawa et al. | |
| 10,899,386 B2 | 1/2021 | Waghmare et al. | |
| 10,967,918 B2 | 4/2021 | Waghmare et al. | |
| 2015/0274209 A1 | 10/2015 | Basappa et al. | |
| 2021/0070365 A1 | 3/2021 | O'Bannon et al. | |

* cited by examiner

*Primary Examiner* — Joseph D. Pape
*Assistant Examiner* — Dana D Ivey
(74) *Attorney, Agent, or Firm* — Jeremy J. Klobucar

(57) ABSTRACT

A structural support system for a vehicle having a longitudinal axis extending from a front of the vehicle to a rear of the vehicle includes a cradle configured to support an engine of the vehicle, a structural side rail assembly having first and second side rails, a first set of six cradle attachments coupling the cradle to the first side rail, and a second set of six cradle attachments coupling the cradle to the second side rail. A predetermined portion of the cradle attachments of both the first and second set of six cradle attachments are designed to intentionally detach during a frontal impact event to facilitate absorbing impact energy and reducing deceleration and passenger compartment intrusion.

17 Claims, 6 Drawing Sheets

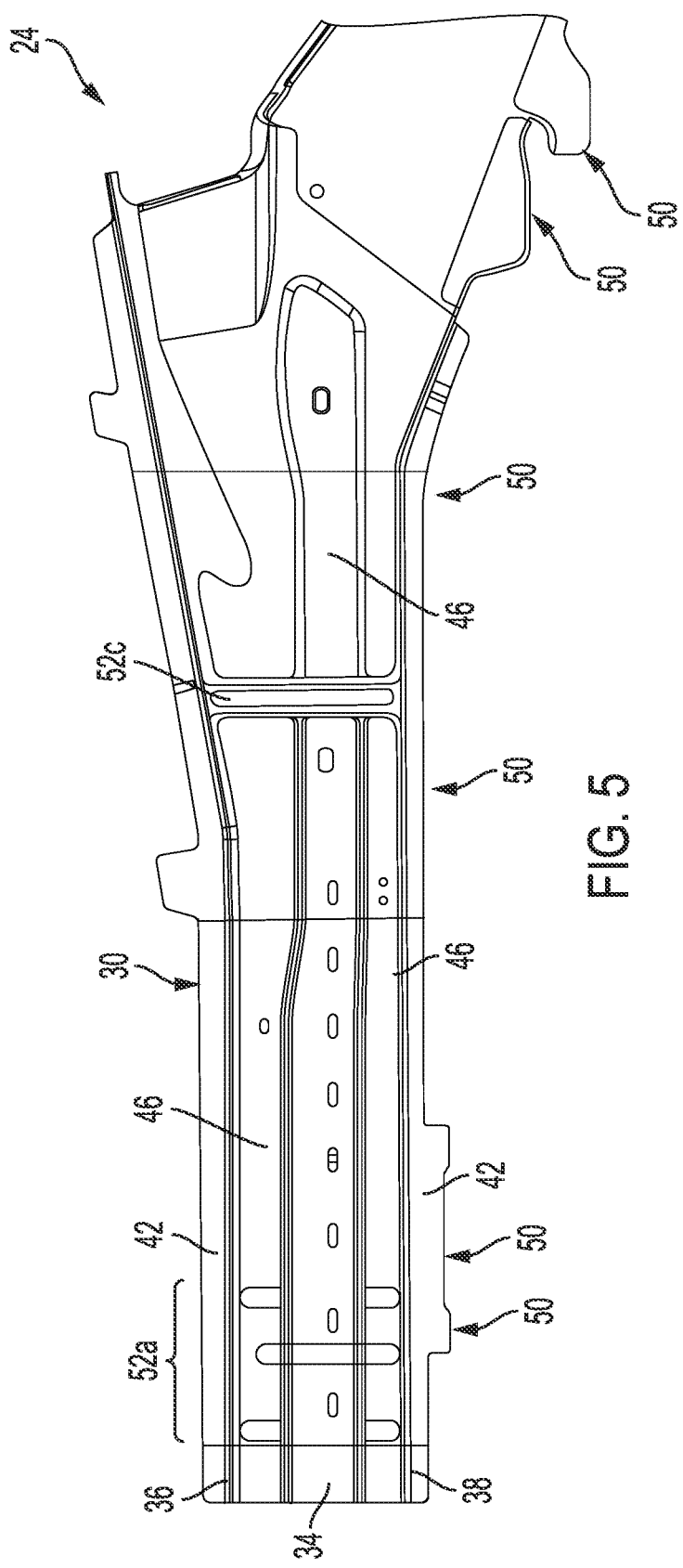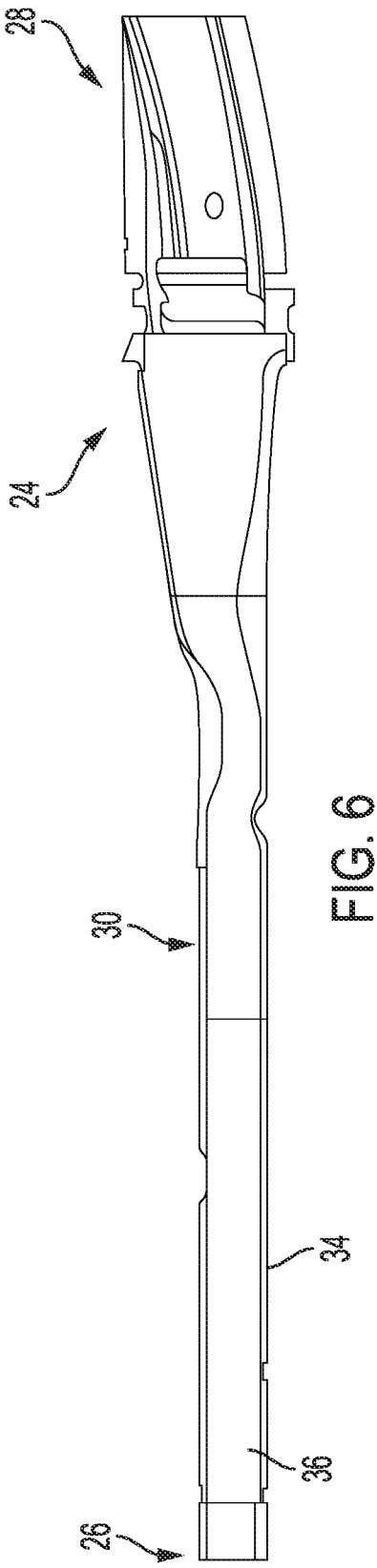

VEHICLE CRADLE ASSEMBLY WITH IMPACT DETACHMENT SCRIPT

FIELD

The present application relates generally to vehicle structural systems and, more particularly, to a vehicle structural system with a cradle bolt detachment script to improve dynamic crush and performance in frontal impact events.

BACKGROUND

Some vehicles include impact protection structures to absorb energy from an impact event to protect vehicle passengers. In frontal impact events, a large amount of the impact can be directed toward the passenger compartment. Therefore, frontal impact protection structures are typically designed to reduce deceleration for reduced passenger compartment intrusion and improved occupant performance. However, while conventional impact protection structures do work well for their intended purpose, it is desirable to provide continuous improvement in the relevant art.

SUMMARY

According to one example aspect of the invention, a structural support system for a vehicle having a longitudinal axis extending from a front of the vehicle to a rear of the vehicle is provided. In one example implementation, the system includes a cradle configured to support an engine of the vehicle, a structural side rail assembly having first and second side rails, a first set of six cradle attachments coupling the cradle to the first side rail, and a second set of six cradle attachments coupling the cradle to the second side rail. A predetermined portion of the cradle attachments of both the first and second set of six cradle attachments are designed to intentionally detach during a frontal impact event to facilitate absorbing impact energy and reducing deceleration and passenger compartment intrusion.

In addition to the foregoing, the described system may include one or more of the following features: wherein each cradle attachment of the first and second sets of six cradle attachments includes a bolt coupling the first or second side rail to the cradle; wherein the first and second sets of six cradle attachments are identical; and wherein the first and second sets of six cradle attachments include a pair of first cradle attachments, a pair of second cradle attachments disposed rearward of the pair of first cradle attachments, a pair of third cradle attachments disposed rearward of the pair of second cradle attachments, a pair of fourth cradle attachments disposed rearward of the pair of third cradle attachments, a pair of fifth cradle attachments disposed rearward of the pair of fourth cradle attachments, and a pair of sixth cradle attachments disposed rearward of the pair of fifth cradle attachments.

In addition to the foregoing, the described system may include one or more of the following features: wherein the third and fourth pairs of cradle attachments include fasteners configured to detach under the force of the frontal impact event to allow the engine to displace toward a rear of the vehicle; wherein the fasteners are M-10 bolts; and wherein the first and second pairs of cradle attachments include second fasteners configured to maintain the attachment between the cradle and the first and second side rails during the frontal impact event.

In addition to the foregoing, the described system may include one or more of the following features: wherein the fifth pair of cradle attachments includes fasteners configured to maintain the attachment between the cradle and the first and second side rails during the frontal impact; wherein the fifth pair of cradle attachments further includes an attachment arm with a fracture feature configured to fracture during the frontal impact; wherein the attachment arm is cast with a portion of the cradle and includes a proximal end and a distal end, and wherein the fracture feature includes a window defined between two bridges connecting the distal end with the proximal end of the attachment arm; and wherein the first and second side rails each include a plurality of collapsing features configured to facilitate collapsing of the first and second side rails to absorb energy of the frontal impact event.

In addition to the foregoing, the described system may include one or more of the following features: wherein the plurality of collapsing features includes a crush initiator located at a forward end of each of the first and second side rails, a first collapsing feature configured to facilitate axial collapsing of the associated first or second side rail during the frontal impact, a second collapsing feature configured to facilitate axial collapsing of the associated first or second side rail during the frontal impact, and a third collapsing feature configured to facilitate axial collapsing of the associated first or second side rail during the frontal impact; and wherein the crush initiator is located forward of the first cradle attachment along the direction of the longitudinal axis.

In addition to the foregoing, the described system may include one or more of the following features: wherein the first collapsing feature is located between the second and third cradle attachments along the direction of the longitudinal axis, and wherein the first collapsing feature is configured to collapse the associated first or second side rail in an inboard cross-car direction; wherein the second collapsing feature is located between the third and fourth cradle attachments along the direction of the longitudinal axis, and wherein the second collapsing feature is configured to collapse the associated first or second side rail in an outboard cross-car direction; and wherein the third collapsing feature is located between the fourth and fifth cradle attachments along the direction of the longitudinal axis, and wherein the third collapsing feature is configured to collapse the associated first or second side rail in an inboard cross-car direction.

According to another example aspect of the invention, a structural support system for a vehicle having a longitudinal axis extending from a front of the vehicle to a rear of the vehicle is provided. In one example implementation, the system includes a cradle configured to support an engine of the vehicle, a structural side rail assembly having first and second side rails, a first set of six cradle attachments coupling the cradle to the first side rail, and a second set of six cradle attachments coupling the cradle to the second side rail. A predetermined portion of the cradle attachments of both the first and second set of six cradle attachments are configured to intentionally detach during a frontal impact event to facilitate absorbing impact energy and reducing deceleration and passenger compartment intrusion.

In addition to the foregoing, the described system may include one or more of the following features: wherein the first and second sets of six cradle attachments include a pair of first cradle attachments, a pair of second cradle attachments disposed rearward of the pair of first cradle attachments, a pair of third cradle attachments disposed rearward of the pair of second cradle attachments, a pair of fourth cradle attachments disposed rearward of the pair of third cradle attachments, a pair of fifth cradle attachments disposed rearward of the pair of fourth cradle attachments, and a pair of sixth cradle attachments disposed rearward of the pair of fifth cradle attachments. The third and fourth pairs of cradle attachments include fasteners configured to detach under the force of the frontal impact event to allow the engine to displace toward a rear of the vehicle.

In addition to the foregoing, the described system may include one or more of the following features: wherein each of the first and second side rails further include (i) a first collapsing feature configured to facilitate axial collapsing of the associated first or second side rail during the frontal impact, wherein the first collapsing feature is located between the second and third cradle attachments along the direction of the longitudinal axis, and wherein the first collapsing feature is configured to collapse the associated first or second side rail in an inboard cross-car direction; (ii) a second collapsing feature configured to facilitate axial collapsing of the associated first or second side rail during the frontal impact, wherein the second collapsing feature is located between the third and fourth cradle attachments along the direction of the longitudinal axis, and wherein the second collapsing feature is configured to collapse the associated first or second side rail in an outboard cross-car direction; and (iii) a third collapsing feature configured to facilitate axial collapsing of the associated first or second side rail during the frontal impact, wherein the third collapsing feature is located between the fourth and fifth cradle attachments along the direction of the longitudinal axis, and wherein the third collapsing feature is configured to collapse the associated first or second side rail in the inboard cross-car direction.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 5 is another side view of a portion of the side rail assembly, in accordance with the principles of the present disclosure;

FIG. 6 is a top view of the portion of the side rail assembly shown in FIG. 5, in accordance with the principles of the present disclosure.

DETAILED DESCRIPTION

The present application is directed to a vehicle structural support system configured to absorb impact loads during a frontal impact event. The system includes a front end module with opposed structural side rails each coupled to an engine cradle at six locations. Each side rail includes a crush initiator and three deformation beads, and is configured to detach from the cradle at predetermined locations and bend in a desired inboard or outboard axial direction during the frontal impact event, to thereby reduce deceleration and eliminate passenger compartment intrusion.

Figure 1:
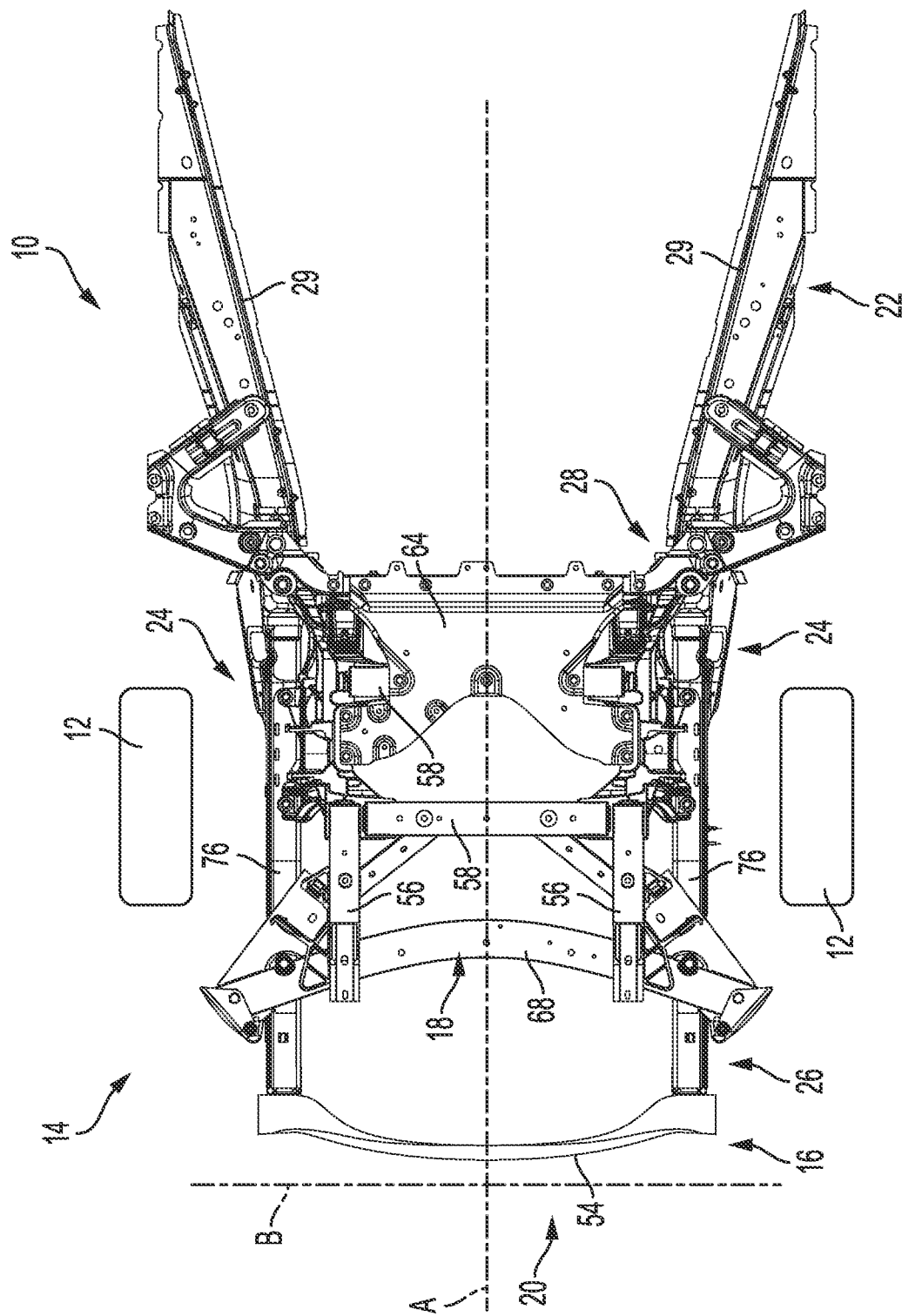
FIG. 1 is a bottom view of an example vehicle structural support system including an engine cradle and side rail assembly in accordance with the principles of the present disclosure.
Figure 2:
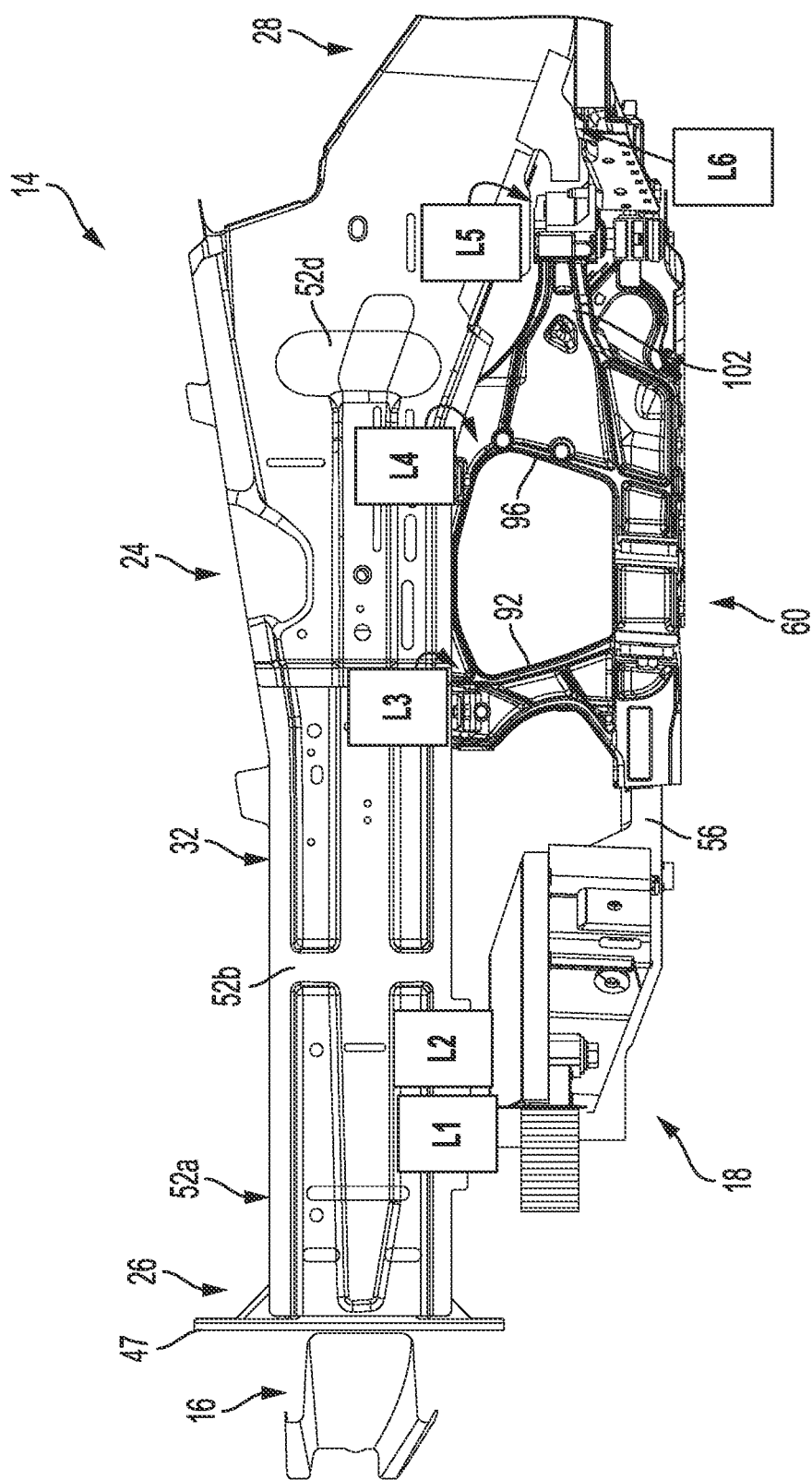
FIG. 2 is a side view of the engine cradle and side rail assembly shown in FIG. 1, in accordance with the principles of the present disclosure.

With initial reference to FIGS. 1 and 2, an example vehicle is illustrated and generally identified at reference numeral 10. The vehicle 10 generally includes wheels 12 and a structural support assembly or system 14 including a front end module (FEM) 16 and a cradle 18. A front end 20 of the vehicle 10 is illustrated and the vehicle 10 generally extends fore-aft along a central axis 'A' between the front 20 and rear of the vehicle (not shown). An axis 'B' extends cross-car and is orthogonal to central axis 'A'. The illustrated components are configured to provide a structural base for additional vehicle components such as, for example, body panels and a drivetrain.

In the example embodiment, the structural support system 14 further includes a structural side rail assembly 22 including a pair of upper load path beams or main load side rails 24. The main load side rails 24 extend parallel to or substantially parallel to central axis 'A' and generally include a forward end 26 and an opposite rearward end 28. The forward end 26 is disposed toward the vehicle front 20 and connected with FEM 16, and the rearward end 28 is disposed toward the vehicle rear and coupled to a rocker panel (not shown) via an extension 29. Each of the side rails have similar (e.g., mirror image) parts, thus only one rail 24 will be discussed with reference to both.

Figure 4:
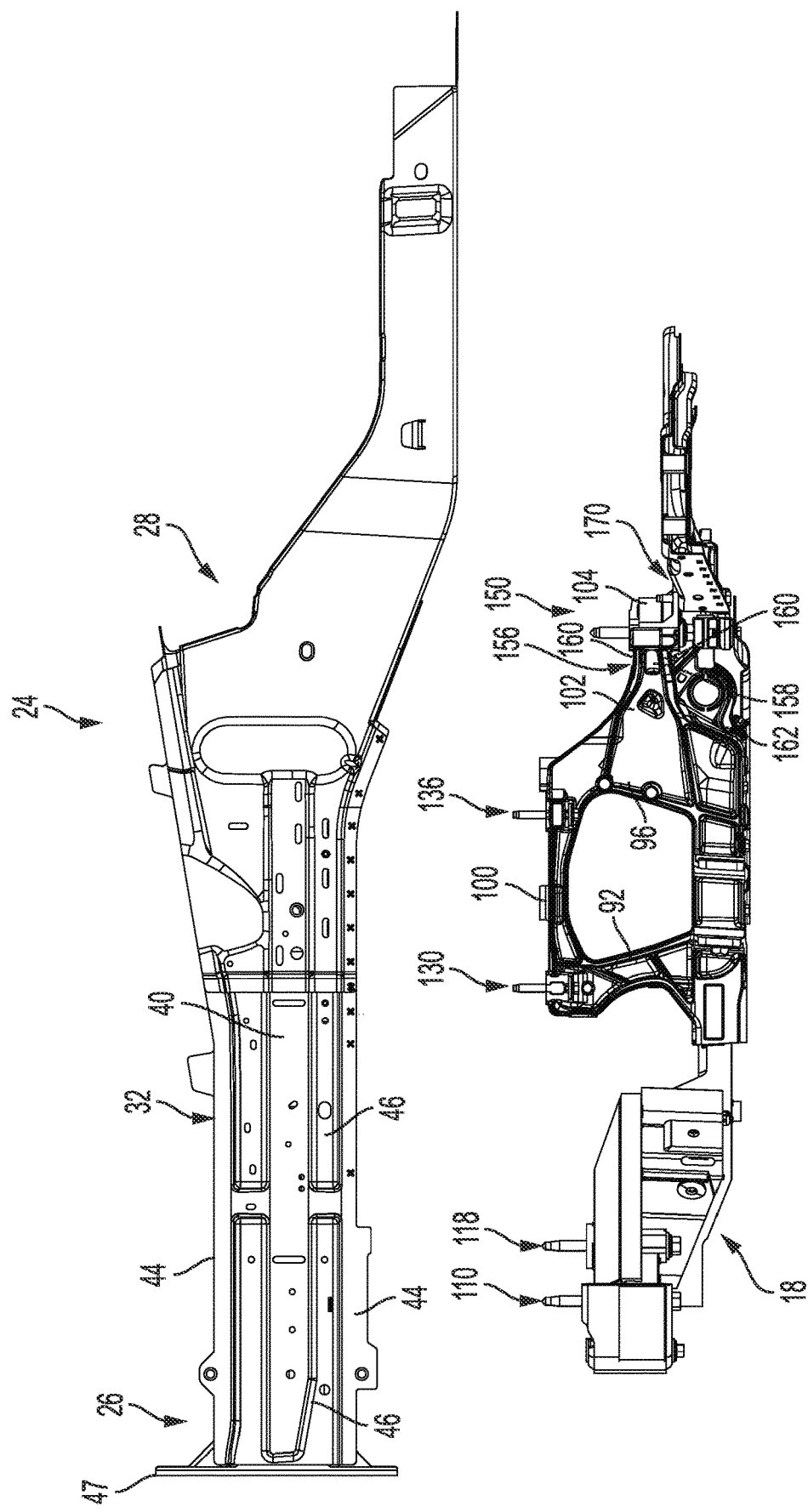
FIG. 4 is a side view of the side rail assembly and engine cradle shown in FIG. 2, before assembly and in accordance with the principles of the present disclosure.

With additional reference to FIGS. 4-6, in the example embodiment, side rail 24 generally includes an inner member or shell 30 (FIG. 5) and an outer member or shell 32 (FIG. 4). The inner shell 30 is generally C-shaped and includes a body panel 34 connected between an upper wall 36 and a lower wall 38. The outer shell 32 includes a generally planar body 40. Connecting flanges 42 extend outward from and generally orthogonal to the walls 36, 38. The connecting flanges 42 are configured to abut with flanges 44 of the outer shell 32 to be connected via spot welding or the like. Additionally, inner and outer shells 30, 32 may include various stampings 46, for example, for reinforcement purposes.

In some embodiments, a plate member 47 is coupled (e.g., welded) to the forward end 26 of the main load side rail 24 and is configured to couple to the FEM 16. The side rails 24 are generally disposed between the front and rear wheels 12 and may define wheel wells and/or include mounting hardware for vehicle shafts and wheels (e.g., control arms, coils, and the like), and other components (not shown). It will be appreciated that rails 24 are not limited to the features shown and described, and may have additional features similar to those described in commonly owned U.S. Pat. No. 10,967,918, issued Apr. 6, 2021, the entire contents of which are incorporated herein by reference thereto. Notably, however, the rails 24 described herein include unique attachment or coupling features 50 to provide multiple connections to the cradle 18, as described herein in more detail.

In the example embodiment, each main load side rail 24 is coupled to the cradle 18 at six different locations, and the shape of each main load side rail 24 is configured to facilitate a degree of controlled axial deformation under predetermined loads such as, for example, frontal impacts events. Accordingly, each side rail 24 includes vertically extending collapsing features 52 to facilitate collapsing of the main load side rail 24 to absorb energy during an impact event. In the illustrated example, main load side rail 24 includes two collapsing features 52 formed in/on the outboard shell 32 and two collapsing features 52 formed in/on the inboard shell 30 (see FIG. 2).

With continued reference to FIGS. 1 and 2, in the example embodiment, the FEM 16 includes or is connected to a front fascia (not shown), a bumper 54, and a radiator mount (not shown). The fascia and bumper 54 extend in the general cross-car direction and are configured to couple to the side rails 24 and/or to other structural member of the vehicle chassis. In at least some implementations, the fascia or bumper 54 define the forwardmost portion of the vehicle 10.

With reference now to FIGS. 1-4, the cradle 18 will be described in more detail. The cradle 18 is a forward portion of the vehicle chassis or frame and is configured to support the vehicle engine and transmission (not shown). Additionally, the cradle 18 is a structural member coupled to the side rail assembly 22 and configured to transmit loads from the front to rear portions of the chassis. In the example embodiment, the cradle 18 includes a pair of opposed fore-aft oriented rails or members 56, and a pair of cross-car oriented support rails or members 58. The fore-aft members 56 are laterally spaced apart in the cross-car direction with one member 56 located on each of the driver and passenger sides of the engine cradle 18. The fore-aft members 56 include brackets or mounts 60 having upwardly extending portions to provide side rail coupling features 50 on opposite sides of the engine.

To support the mounts 60 and engine, the fore-aft members 56 extend generally beneath the mounts 60, through a channel defined by the mounts and/or may be coupled to a forward portion of the mounts 60 and extend forwardly therefrom. To support the engine cradle 18 and engine, the fore-aft members 56 and mounts 60 are coupled to the main chassis including the main load rails 24, as described herein in more detail. As shown in FIG. 1, in the example implementation, the fore-aft members 56 are received inwardly of the main load rails 24 laterally between the front wheels 12, and extend forwardly beyond the front wheels 12 toward the bumper 54. However, it will be appreciated that other orientations are envisioned.

In the example embodiment, the engine cradle cross-car members 58 are laterally spaced apart in the fore-aft direction are coupled at opposed ends to mounts 60 and fore-aft member 56. The cross-car members 58 are configured to provide support against twisting and lateral (cross-car) movement or bending of the fore-aft members 56 and/or mounts 60. Additionally, a cross-car support 62 and skid plate 64 are coupled to and extend between the fore-aft members 56 and/or mounts 60 to further increase structural strength. To further improve the structural integrity of the cradle 18 and provide a more robust mount for the engine and more robust chassis, angled support brackets 66 are coupled to and extend between the fore-aft members 56 and cross-car members 58 and/or other chassis components.

Figure 3:
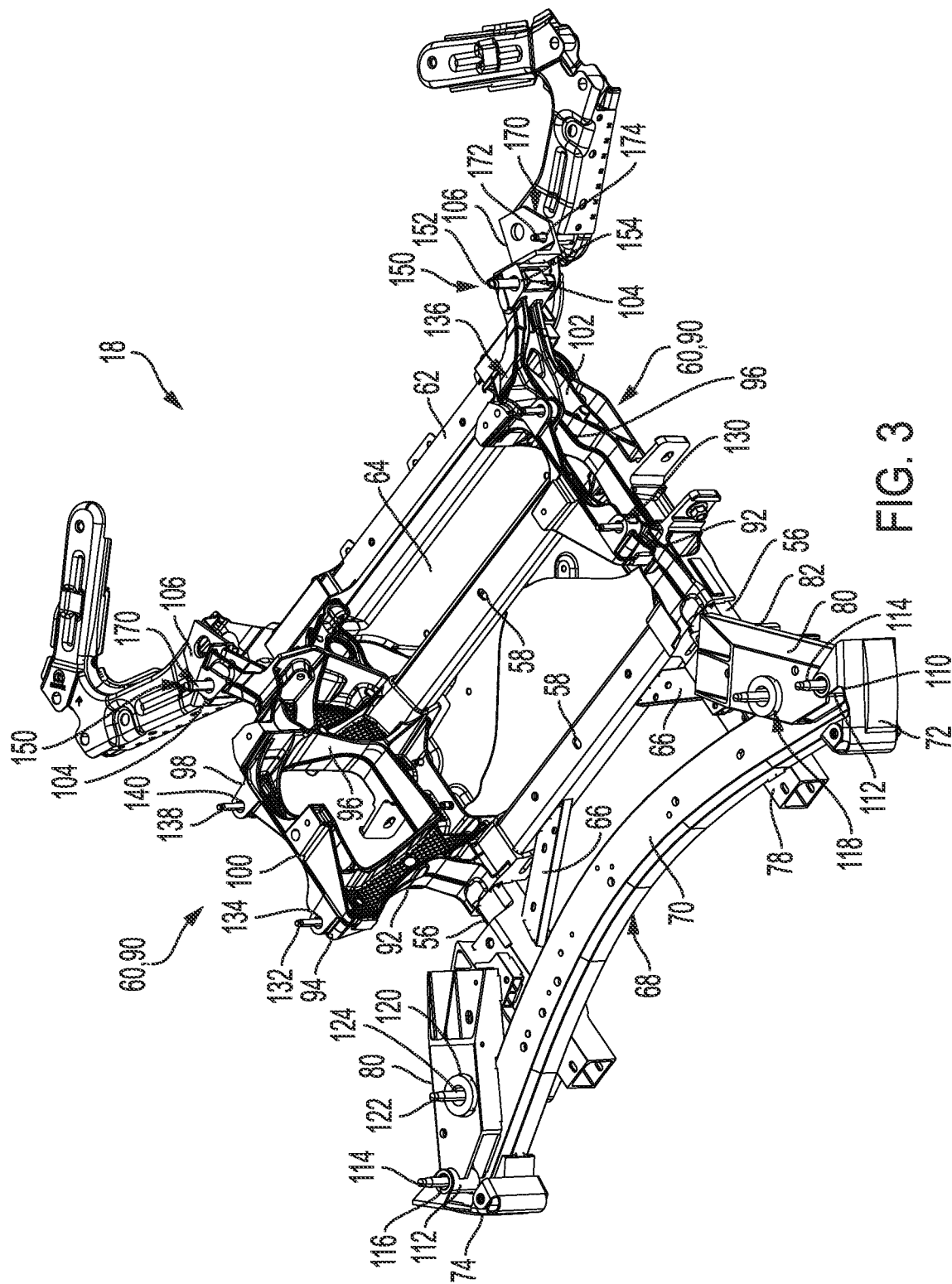
FIG. 3 is a perspective view of the engine cradle shown in FIG. 1, in accordance with the principles of the present disclosure.

With additional reference to FIG. 3, the cradle 18 further includes a cross rail or member 68 having a main body 70, a first end 72, and an opposite second end 74. In the example embodiment, the cross-member 68 is directly coupled to and extends between the opposed main load rails 24. As shown, the cross member 68 is connected to a lower side 76 of the main load rails 24 (generally facing the surface on which the vehicle is situated) and is located rearward of the FEM 16 and forward of the engine cradle 18. The cross-member 68 is located above an upper surface 78 of the fore-aft members 56 and a pair of opposed brackets or braces 80 extend between each of the cross member first and second ends 72, 74 and respective fore-aft member 56. Each brace 80 is coupled to a respective fore-aft member 56 via a bracket 82 and is coupled to the cross member 68 directly or via a bracket 84 (FIG. 1). Further, each brace 80 extends from a respective one of the cradle fore-aft members 56 outwardly toward the adjacent cross member end 72, 74, and in at least some implementations, is at an angle to longitudinal centerline axis 'A' of the vehicle of between 0° and 60°, although other arrangements may be utilized.

With continued reference to FIGS. 2 and 3, each mount 60 includes an attachment arm assembly 90 configured to couple to one of the main load rails 24. In the example embodiment, the attachment arm assembly 90 includes a forward or first attachment arm 92 extending outwardly from the fore-aft member 56 to a distal end 94. Similarly, an intermediate or second attachment arm 96 extends outwardly from the fore-aft member 56 to a distal end 98, and a connecting member 100 is coupled between the distal ends 94, 98. A rear or third attachment arm 102 extends outwardly from the second attachment arm 96 toward the vehicle rear to a distal end 104, and an attachment flange 106 extends outward from the distal end 104.

It will be appreciated that cradle 18 is not limited to the features shown and described, but may have additional features similar to those described in commonly owned U.S. patent application Ser. No. 16/561,925, filed Sep. 5, 2019, the entire contents of which are incorporated herein by reference thereto. Notably, however, cradle 18 described herein includes two additional connections or couplings, one to each main load side rail 24.

As shown in FIGS. 1-3, the cradle 18 includes twelve different locations for attaching to the structural side rail assembly 22, there being six attachment locations with coupling features 50 for each side rail 24. With reference to FIG. 3, the attachment locations of cradle 18 for attaching to the side rail assembly 22 will be described in more detail. In the illustrated example, the cradle 18 includes a pair of first cradle attachments 110 defined by posts 112 and first cradle fasteners 114 (e.g., cradle bolts). One post 112 extends upwardly from each of the cross member ends 72, 74 and defines an aperture 116 to receive the first cradle fastener 114. The first cradle attachment 110 couples to the side rail coupling feature 50 at a first location 'L1' (FIG. 2). A pair of second cradle attachments 118 is defined by posts 120 and second cradle fasteners 122. One post 120 extends upwardly from each of the braces 80 and defines an aperture 124 to receive the second cradle fastener 122. The second cradle attachments 118 couple to the side rail coupling feature 50 at a second location 'L2' (FIG. 2). As shown, the second cradle attachments 118 are positioned rearward and inboard of the first cradle attachments 110.

A pair of third cradle attachments 130 is defined by the first attachment arms 92 and third cradle fasteners 132. An aperture 134 is defined in the first attachment arm distal end 94 to receive the third cradle fastener 132. The third cradle attachments 130 couple to the side rail coupling feature 50 at a third location 'L3' (FIG. 2). A pair of fourth cradle attachments 136 is defined by the second attachment arms 96 and fourth cradle fasteners 138. An aperture 140 is defined in the second attachment arm distal end 98 to receive the fourth cradle fastener 138. The fourth cradle attachments 136 couple to the side rail coupling feature 50 at a fourth location 'L4' (FIG. 2).

A pair of fifth cradle attachments 150 is defined by the third attachment arms 102 and fifth cradle fasteners 152. An aperture 154 is defined in the third attachment arm distal end 104 to receive the fifth cradle fastener 152. The fifth cradle attachments 150 couple to the side rail coupling feature 50 at a fifth location 'L5' (FIG. 2). Additionally, as shown in FIG. 2, the third attachment arm 102 includes a fracture feature 156 configured to fracture during a predefined event, as described herein in more detail. In the example embodiment, the fracture feature 156 (e.g., see FIG. 4) is defined at least in part by a window 158 and thin bridges 160 connecting the distal end 104 to a proximal end 162, which are defined and tuned for a specific fracture. A pair of sixth cradle attachments 170 is defined by the attachment flanges 106 and sixth cradle fasteners 172. An aperture 174 is defined in the attachment flange 106 and is configured to receive the sixth cradle fastener 172. The sixth cradle attachments 170 couple to the side rail coupling feature 50 at a sixth location 'L6' (FIG. 2).

With reference now to FIGS. 4-6, the structural side rail assembly 22 will be described in more detail. The shape of each main load side rail 24 is configured to facilitate a degree of controlled axial deformation and lateral bending under predetermined frontal loads to reduce deceleration without passenger compartment intrusion. Specifically, arranged in order from the side rail forward end 26 toward the rearward end 28, each side rail 24 includes a crush initiator feature 52*a*, a first bead or collapsing feature 52*b*, a second bead or collapsing feature 52*c*, and a third bead or collapsing feature 52*d*. Such features 52 are configured to facilitate axial collapsing of the side rail 24 during the frontal impact.

In the example embodiment, the crush initiator feature 52*a* includes a plurality of bead features formed on the inner shell 30 and configured to facilitate axial crush of the rail tip up to the first cradle attachments 110. The first collapsing feature 52*b* is formed on the side rail outboard side 32 (FIG. 4) and provides a relatively weakened area without reinforcements 46 that is configured to bend the side rail 24 axially inboard under the frontal impact. The second collapsing feature 52*c* is formed on the side rail inboard side 30 (FIG. 5) and provides a relatively weakened area configured to bend the side rail 24 axially outboard under the frontal impact. The third collapsing feature 52*d* is formed on the side rail outboard side 32 (FIG. 4) and provides a relatively weakened area without reinforcements 46 that is configured to bend the side rail 24 axially inboard under the frontal impact. One example side rail deformation is illustrated in a comparison between FIG. 1 (before impact) and FIG. 7 (after impact).

Figure 7:
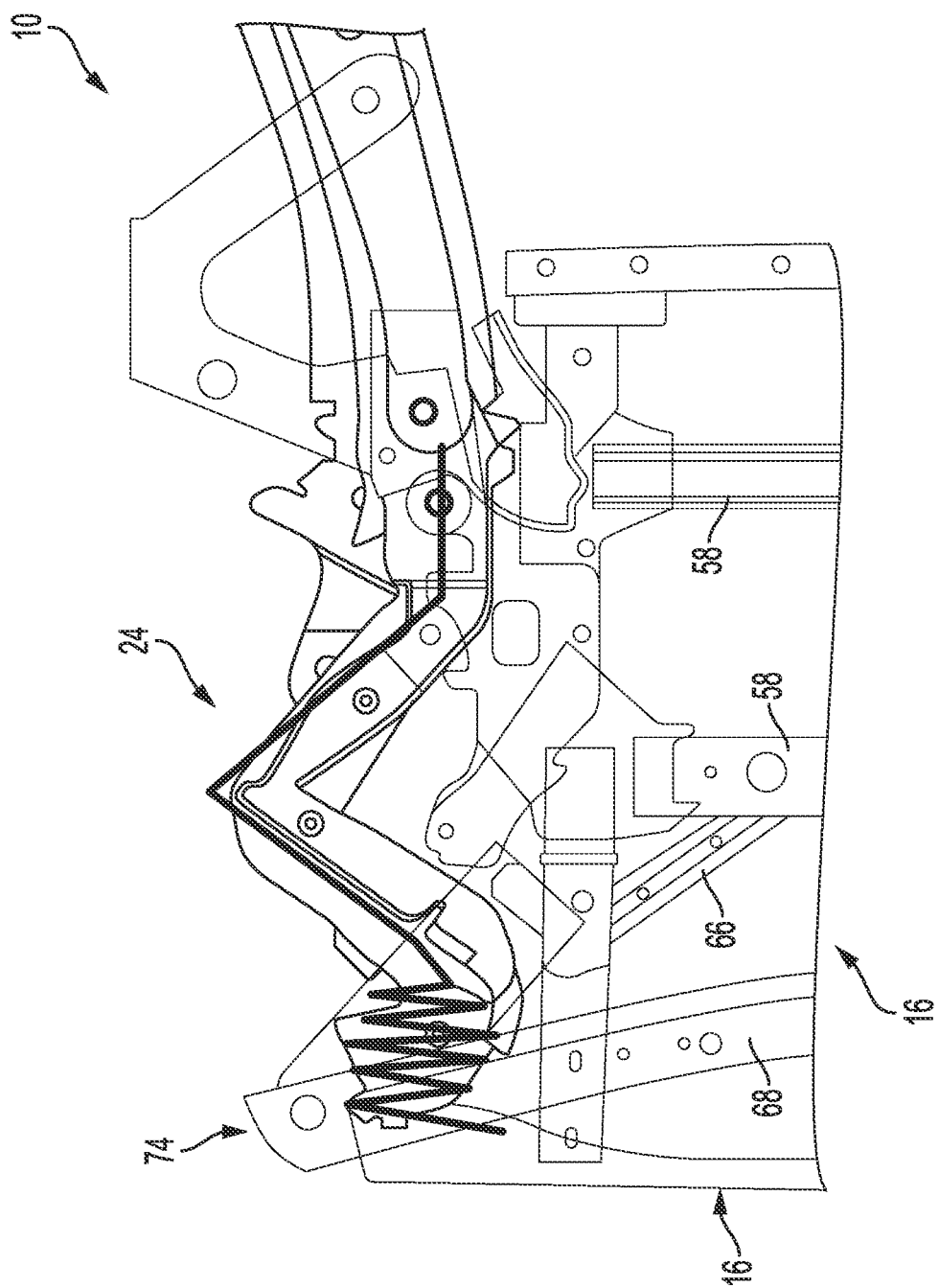
FIG. 7 is a bottom view of the engine cradle and side rail assembly of FIG. 1 after an example frontal impact event, with the engine cradle transparent, in accordance with the principles of the present disclosure.

With reference now to FIGS. 2, 6, and 7, one example deformation and detachment script of the structural support system 14 will be described. As discussed above, the cradle 18 includes twelve attachments with the side rail assembly 22, where a first set of six attachments are made with one side rail 24, and a second set of identical six attachments are made with the other side rail 24. Advantageously, some of the attachments are designed to intentionally detach during the frontal impact event to allow axial collapse of side rails 24 and to reduce deceleration for improved occupant performance. Additionally, the side rails 24 include four collapsing features, including a crush initiator and three beads, to promote the axial deformation and lateral bending for increased energy absorption.

During the example impact event, such as a frontal impact event, the object first impacts the FEM 16, which absorbs some of the impact and subsequently transfers load to the forward ends 28 of the main load path side rails 24. The load then travels through the side rails 24 as described. This initial force from FEM 16 causes rearward movement of the rail forward ends 28, which first collapse rearward at the crush initiator feature 52*a*. The impact force continues rearward through the side rails 24 toward the first and second cradle attachments 110, 118. In the example embodiment, first and second cradle fasteners 114, 122 are high strength fasteners (e.g., M-14 bolts) and configured to maintain the attachment between the cradle 18 and the side rails 24 during the impact event. The impact force then continues rearward to the first collapsing features 52*b*, which cause the side rails 24 at that location to axially deform and laterally bend inboard to absorb more of the impact.

The impact force continues rearward through the side rails 24 to the third cradle attachments 130. In the example embodiment, the third cradle fasteners 132 are lower strength fasteners (e.g., M-10 bolts) configured to detach (e.g., shear) under the impact force, thereby separating the third cradle attachments 130. The impact force then travels rearward to the second collapsing features 52*c*, which cause the side rails 24 at that location to axially deform and laterally bend outboard to absorb more of the impact. The impact force continues rearward to the fourth cradle attachments 136. In the example embodiment, the fourth cradle fasteners 138 are also lower strength fasteners configured to detach under the impact force, thereby separating the fourth cradle attachments 136.

The impact force then continues rearward through the side rails 24 to the third collapsing features 52*d*, which cause the side rails 24 at that location to axially deform and laterally bend inboard to absorb more of the impact. The impact force then travels rearward to the fifth cradle attachment 150. In the example embodiment, the fifth cradle fasteners 152 are high strength fasteners configured to maintain the attachment between the cradle 18 and the side rails 24 during the impact event. However, the impact causes the fracture feature 156 of the cast third attachment arm 102 to fracture, thereby allowing rearward movement of the cradle 18, which facilitates rail deformation at first collapsing features 52*b* and inboard collapse of the rail at third collapsing features 52*d*. The impact force then travels further rearward to the sixth cradle attachments 170. In the example embodiment, the sixth cradle fasteners 172 are high strength fasteners configured to maintain the attachment between the cradle 18 and the side rails 24 during the impact event. Additionally, impact force is transferred through the sixth cradle attachments 170 to the cross-car support 62 and skid plate 64 to facilitate moving the cradle 18 rearward and absorb impact energy and improve dynamic crush.

Described herein are systems and methods for a vehicle structure support configured to reduce deceleration and passenger compartment intrusion during frontal impact events. The systems include a cradle attached to a structural side rail assembly at twelve different locations. Some of the attachments are configured to detach during the impact event, and the cradle includes an aluminum cast part configured to fracture between the fourth and fifth attachments, thereby allowing the engine and transmission to displace rearward to improve dynamic crush. Further, main load path side rails of the rail assembly include collapsing features configured to cause axial displacement and lateral bending of the side rails to further absorb impact energy.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A structural support system for a vehicle having a longitudinal axis extending from a front of the vehicle to a rear of the vehicle, the system comprising:
    a cradle configured to support an engine of the vehicle;
    a structural side rail assembly having first and second side rails;
    a first set of six cradle attachments coupling the cradle to the first side rail; and
    a second set of six cradle attachments coupling the cradle to the second side rail,
    wherein a predetermined portion of the cradle attachments of both the first and second set of six cradle attachments are designed to intentionally detach during a frontal impact event to facilitate absorbing impact energy and reducing deceleration and passenger compartment intrusion, and
    wherein the first and second sets of six cradle attachments comprise:
        a pair of first cradle attachments;
        a pair of second cradle attachments disposed rearward of the pair of first cradle attachments;
        a pair of third cradle attachments disposed rearward of the pair of second cradle attachments;
        a pair of fourth cradle attachments disposed rearward of the pair of third cradle attachments;
        a pair of fifth cradle attachments disposed rearward of the pair of fourth cradle attachments; and
        a pair of sixth cradle attachments disposed rearward of the pair of fifth cradle attachments.

2. The system of claim 1, wherein the third and fourth pairs of cradle attachments include fasteners configured to detach under the force of the frontal impact event to allow the engine to displace toward a rear of the vehicle.

3. The system of claim 2, wherein the fasteners are M-10 bolts.

4. The system of claim 1, wherein the first and second pairs of cradle attachments include second fasteners configured to maintain the attachment between the cradle and the first and second side rails during the frontal impact event.

5. The system of claim 1, wherein the fifth pair of cradle attachments includes fasteners configured to maintain the attachment between the cradle and the first and second side rails during the frontal impact.

6. The system of claim 5, wherein the fifth pair of cradle attachments further includes an attachment arm with a fracture feature configured to fracture during the frontal impact.

7. The system of claim 6, wherein the attachment arm is cast with a portion of the cradle and includes a proximal end and a distal end, and wherein the fracture feature includes a window defined between two bridges connecting the distal end with the proximal end of the attachment arm.

8. The system of claim 1, wherein the first and second side rails each include a plurality of collapsing features configured to facilitate collapsing of the first and second side rails to absorb energy of the frontal impact event.

9. The system of claim 8, wherein the plurality of collapsing features comprises:
    a crush initiator located at a forward end of each of the first and second side rails;
    a first collapsing feature configured to facilitate axial collapsing of the associated first or second side rail during the frontal impact;
    a second collapsing feature configured to facilitate axial collapsing of the associated first or second side rail during the frontal impact; and
    a third collapsing feature configured to facilitate axial collapsing of the associated first or second side rail during the frontal impact.

10. The system of claim 9, wherein the crush initiator is located forward of the first cradle attachment along the direction of the longitudinal axis.

11. The system of claim 9, wherein the first collapsing feature is located between the second and third cradle attachments along the direction of the longitudinal axis, and
    wherein the first collapsing feature is configured to collapse the associated first or second side rail in an inboard cross-car direction.

12. The system of claim 9, wherein the second collapsing feature is located between the third and fourth cradle attachments along the direction of the longitudinal axis, and
    wherein the second collapsing feature is configured to collapse the associated first or second side rail in an outboard cross-car direction.

13. The system of claim 9, wherein the third collapsing feature is located between the fourth and fifth cradle attachments along the direction of the longitudinal axis, and
    wherein the third collapsing feature is configured to collapse the associated first or second side rail in an inboard cross-car direction.

14. The system of claim 1, wherein each cradle attachment of the first and second sets of six cradle attachments includes a bolt coupling the first or second side rail to the cradle.

15. The system of claim 1, wherein the first and second sets of six cradle attachments are identical.

16. A structural support system for a vehicle having a longitudinal axis extending from a front of the vehicle to a rear of the vehicle, the system comprising:
    a cradle configured to support an engine of the vehicle;
    a structural side rail assembly having first and second side rails;
    a first set of six cradle attachments coupling the cradle to the first side rail; and
    a second set of six cradle attachments coupling the cradle to the second side rail,
    wherein a predetermined portion of the cradle attachments of both the first and second set of six cradle attachments are configured to intentionally detach during a frontal impact event to facilitate absorbing impact energy and reducing deceleration and passenger compartment intrusion,
    wherein the first and second sets of six cradle attachments comprise:
        a pair of first cradle attachments;

a pair of second cradle attachments disposed rearward of the pair of first cradle attachments;

a pair of third cradle attachments disposed rearward of the pair of second cradle attachments;

a pair of fourth cradle attachments disposed rearward of the pair of third cradle attachments;

a pair of fifth cradle attachments disposed rearward of the pair of fourth cradle attachments; and a pair of sixth cradle attachments disposed rearward of the pair of fifth cradle attachments, and wherein the third and fourth pairs of cradle attachments include fasteners configured to detach under the force of the frontal impact event to allow the engine to displace toward a rear of the vehicle.

17. The system of claim 16, wherein each of the first and second side rails further includes:

a first collapsing feature configured to facilitate axial collapsing of the associated first or second side rail during the frontal impact, wherein the first collapsing feature is located between the second and third cradle attachments along the direction of the longitudinal axis, and wherein the first collapsing feature is configured to collapse the associated first or second side rail in an inboard cross-car direction;

a second collapsing feature configured to facilitate axial collapsing of the associated first or second side rail during the frontal impact, wherein the second collapsing feature is located between the third and fourth cradle attachments along the direction of the longitudinal axis, and wherein the second collapsing feature is configured to collapse the associated first or second side rail in an outboard cross-car direction; and a third collapsing feature configured to facilitate axial collapsing of the associated first or second side rail during the frontal impact, wherein the third collapsing feature is located between the fourth and fifth cradle attachments along the direction of the longitudinal axis, and wherein the third collapsing feature is configured to collapse the associated first or second side rail in the inboard cross-car direction.

* * * * *